United States Patent [19]

Horii et al.

[11] Patent Number: 5,539,015

[45] Date of Patent: Jul. 23, 1996

[54] SYNTHETIC RESIN COMPOSITION AND INTERIOR MATERIAL COATED WITH THE SAME

[75] Inventors: Mitsumasa Horii, Seto; Masahiro Sugiura, Aichi-ken; Seiji Onoda, Seto; Yoshio Yamada, Nagoya; Osamu Araki, Toyota; Yoshiro Umemoto, Nagoya; Kazuo Ito, Toyoake; Takatoshi Sekihara, Nagoya; Akihiro Matsuyama, Nagoya; Masaaki Izumichi, Nagoya; Kiyoshi Umehara; Reizaburo Tomioka, both of Takaishi, all of Japan

[73] Assignees: Kabushiki Kaisha Toyota Chuo Kenkyusho, Aichi-ken; Toyota Jidosha Kabushiki Kaisha, Toyota; Toyoda Boshoku Corporation, Kariya; Dainippon Ink and Chemicals, Incorporated, Tokyo-to, all of Japan

[21] Appl. No.: 250,865

[22] Filed: May 27, 1994

Related U.S. Application Data

[63] Continuation of Ser. No. 918,040, Jul. 24, 1992, abandoned.

[30] Foreign Application Priority Data

| Jul. 25, 1991 | [JP] | Japan | 3-209797 |
| Nov. 19, 1991 | [JP] | Japan | 3-331183 |
| Nov. 29, 1991 | [JP] | Japan | 3-317008 |
| Mar. 16, 1992 | [JP] | Japan | 4-058494 |
| Mar. 16, 1992 | [JP] | Japan | 4-058495 |

[51] Int. Cl.⁶ .............................. C08K 9/12; C08K 9/02
[52] U.S. Cl. .................. 523/102; 524/161; 524/162; 524/192; 524/375; 524/445; 524/446; 524/447; 524/417; 524/450; 524/503; 524/556; 524/563; 524/567; 524/557; 524/711; 524/733

[58] Field of Search ................... 524/450, 446, 524/447, 417, 161, 162, 375, 192, 711, 445, 503, 563, 567, 556, 557, 733; 523/102

[56] References Cited

U.S. PATENT DOCUMENTS

| 3,149,998 | 9/1964 | Thurmaier | 524/192 |
| 3,164,562 | 1/1965 | Breed | 524/161 |
| 3,423,346 | 1/1969 | Klaus et al. | 524/375 |
| 3,547,845 | 12/1970 | Pinkney | 524/733 |
| 4,128,518 | 12/1978 | Oyamada et al. | 524/733 |
| 4,250,070 | 2/1981 | Ley et al. | 524/192 |
| 5,084,503 | 1/1992 | Iacoviello | 524/375 |

FOREIGN PATENT DOCUMENTS

| 61-40120 | 2/1986 | Japan . |
| 62-010145 | 1/1987 | Japan . |
| 2145864 | 6/1990 | Japan . |

*Primary Examiner*—Veronica P. Hoke
*Attorney, Agent, or Firm*—Oblon, Spivak, McClelland, Maier, & Neustadt

[57] ABSTRACT

A synthetic resin composition comprises an aqueous medium, a surfactant, and a resin and filler dispersed in the aqueous medium by the surfactant. The surfactant comprises a first high molecular weight compound having a weight-average molecular weight of at least 10000 and a second high molecular weight compound having a weight-average molecular weight of not less than 150 and less than 10000. In the synthetic resin composition, a solid material is well dispersed and the viscosity doesn't remarkably increase even if a solid content is increased. So, the increased amount of a non-volatile matter may be used and the storage stability improves. Further, flame retardation, deodorization, heat resistance and light fastness also improve. In addition, an interior material coated with the synthetic resin composition is provided.

12 Claims, 1 Drawing Sheet

SYNTHETIC RESIN COMPOSITION AND INTERIOR MATERIAL COATED WITH THE SAME

This application is a Continuation of application Ser. No. 07/918,040, filed on Jul. 24, 1992, now abandoned.

BACKGROUND OF THE INVENTION

1. Field of the Invention

This invention relates to a synthetic resin composition suitable for use on a cloth for a carpet or a facing material for a seat of a vehicle, or an inner cloth for a door, and also relates to an interior material with a layer coated with the synthetic resin composition.

2. Description of the Related Art

Usually, a synthetic resin composition is laminated on a fiber material for a vehicle. The above synthetic resin composition contains functional materials to do various functions. For example, to remove an odor efficiently, the synthetic resin composition is composed of a latex comprising a resin or a rubber and a filler comprising a hydrated magnesium silicate based clay mineral and activated carbon, which are dispersed into an aqueous medium by a surfactant. The synthetic resin composition is applied to an interior material for a vehicle, thereby removing an odor in the vehicle. This is described in Japanese Laid-Open Patent Publication No. 145864/1990. The synthetic resin composition demonstrates good deodorization for various kinds of odors due to the adsorptivity of a hydrated magnesium silicate based clay mineral and activated carbon. Furthermore, the synthetic resin composition also exhibits the antistatic function by using activated carbon and a cloth, both of which have the electric conductivity.

As for an interior material for a vehicle in which a backing material is laminated on a rear face of the fiber material, a synthetic resin latex is used as the backing material. An inorganic flame retardant and an organic flame retardant are also used with the synthetic resin latex to perform flame retardation. For example, in a synthetic resin composition for an interior material of a vehicle, tetrabromobisphenol A and antimony trioxide are added to a synthetic resin latex for flame retardation.

However, a conventional synthetic resin composition uses only a high molecular weight compound having the weight-average molecular weight of at least 10000 as a dispersant, thereby increasing the viscosity. When the content of a solid material such as a resin or a filler is high, the viscosity is extremely increased. Therefore, the synthetic resin composition industrially usable contains at most 25% of a solid material.

A solid material (hereinafter referred to as a non-volatile matter because a solid material remains after the volatilization) in the synthetic resin composition largely influences the productivity and coating processability (workability) during the coating process and the drying process. In a conventional way, a non-volatile matter is a little and the drying time is long, thereby requiring a high cost and decreasing the productivity and the processability.

As above described, to increase the productivity and processability, it is desirable to increase the amount of a non-volatile matter in the synthetic resin composition.

When an organic flame retardant such as tetrabromobisphenol A and an inorganic flame retardant such as antimony trioxide or antimony pentoxide are used with a filler such as activated carbon or a hydrated magnesium silicate based clay mineral, flame retardation of an interior material in which the synthetic resin composition is used as a backing material improves, but the deodorization deteriorates.

When an acrylic resin in which the glass-transition temperature is not more than −20° C. is used for a ceiling material for a vehicle, it is difficult to form the ceiling material due to a soft resin layer. When an acrylic resin in which the glass-transition temperature is not less than +20° C. is used, it is also difficult to form the ceiling material due to a hard resin layer.

The use of acrylic resin in which the glass-transition temperature is not less than 0° C. on a facing material for a seat results in hard texture and poor seat finish. The use of acrylic resin in which the glass-transition temperature is not more than −55° C. results in poor bonding to the facing material.

As for a rubber latex which is used as a main component of the synthetic resin composition, a layer formed of such latex has poor heat resistance and poor light fastness. So when the layer is exposed to heat or sunlight, it deteriorates with the lapse of time, resulting in poor texture, poor bonding strength to a cloth and peeling off of the layer. Therefore, this material is not suitable for use at parts much influenced by heat and light. The addition of a benzotriazole compound and a benzophenone compound to the synthetic resin composition improves light fastness but not heat resistance. A stabilizer which improves heat resistance will not sufficiently improve light fastness. In order to satisfy both heat resistance and light fastness, an expensive light-stabilizer and an expensive heat-stabilizer have to be used, which causes problems such as selection of proper amounts and high cost.

A backing material comprising the compositions described in Japanese Laid-Open Patent Publication No. 145864/1990 contains only 20% of a non-volatile matter. To form a backing layer which has a bubbling open cell, a thin bubbling backing layer is formed and then a further backing layer is formed thereon repeatedly. So the workability is extremely bad. In this method in which one backing layer having a bubbling open cell is laminated on another backing layer also having a bubbling open cell, a backing material is apt to enter into a cell of the backing layer formed previously. So the deodorization doesn't improve to the extent that is expected.

SUMMARY OF THE INVENTION

It is an object of the present invention to provide a synthetic resin composition for use on an interior material in which a non-volatile matter is well dispersed and the viscosity doesn't remarkably increase even if a solid content is increased. So, the increased amount of a non-volatile matter may be used and the storage stability improves. Further, flame retardation, deodorization, heat resistance and light fastness also improve.

It is another object of the present invention to provide an interior material for a vehicle using the synthetic resin composition, in which the texture, flame retardation, deodorization and light fastness improve without the deterioration of workability.

The inventors have found that an interior material formed by applying the synthetic resin composition containing a particular flame retardant and a particular stabilizer to a cloth and drying it exhibits excellent flame retardation, light fastness and heat resistance; provides good texture for a long time; and maintains strong bonding strength between a cloth and resin layer, thus providing a material having excellent ability to deodorize.

In the present invention, the synthetic resin composition comprises an aqueous medium, a surfactant, a resin and a filler, both of which are dispersed in the aqueous medium by the surfactant. The feature of the present invention is in that the surfactant comprises a first high molecular weight compound having the weight-average molecular weight of at least 10000, and a second high molecular weight compound having the weight-average molecular weight of not less than 150 and less than 10000.

In the synthetic resin composition according to the present invention, a resin, a filler and other mixed substances are dispersed in an aqueous medium by a surfactant, and the surfactant comprises at least the first high molecular weight compound and the second high molecular weight compound.

DETAILED DESCRIPTION OF THE INVENTION

The present invention will be hereinafter described in detail.

An aqueous medium of the present invention is a dispersant by which resin particles or rubber particles and a filler are dispersed, and it may contain a water soluble polymer and an inorganic salt and the like. The aqueous medium is volatilized by drying after coating, thereby fusing resin particles and a filler and forming a resin layer.

A surfactant of the present invention comprises a first high molecular weight compound having the weight-average molecular weight of at least 10000, and a second high molecular weight compound having the weight-average molecular weight of not less than 150 and less than 10000. When an aqueous medium contains a compound having the weight-average molecular weight of less than 150, a surfactant enters into an inner part of a pore of a filler (especially in case a filler is a clay mineral or activated carbon). As a result, the function of a filler is deteriorated and a surfactant itself is vaporized to become a source of an odor. Moreover, the surfactant performs a chemical reaction with the substances in an atmosphere, thereby generating an odor. When a surfactant comprises only a high molecular weight compound having the weight-average molecular weight of at least 10000, it functions as a protective colloid thickener rather than a dispersant which supports the deflocculation and the dispersion of secondary particles of a filler. Therefore, the surfactant prevents the filler from precipitating by means of the formation of a network structure of a protecting colloid thickener under such a condition that the deflocculation and the dispersion of a secondary particle of a filler is not enough. The more the weight-average molecular weight increases, the more the thickening effect increases. Considering the productivity and workability in producing the desired synthetic resin composition, it is necessary to make the viscosity proper by increasing the amount of water. So the synthetic resin composition contains at most 25% of a non-volatile matter.

The synthetic resin composition requires the adjustment of the viscosity in accordance with a coating method. When a surfactant contains only a high molecular weight compound having the weight-average molecular weight of not less than 150 and less than 10000, an aqueous medium shows the dispersing effect more than the thickening effect. For increasing the viscosity to a desired level, it is necessary to use a surfactant in an amount greater than that required for the deflocculation and dispersion of secondary particles of a filler. The use of much surfactant for adjusting the viscosity is not preferable because of increased cost and influence on functions of the material. Therefore, a surfactant comprising a high molecular weight compound having the weight-average molecular weight of not less than 10000 is used together for adjusting viscosity.

A desirable amount of a high molecular weight compound having the weight-average molecular weight of not less than 150 and less than 10000 is that a solid content thereof is in the range of 0.3 to 10 parts by weight with respect to 100 parts by weight of a non-volatile matter of a filler (comprising activated carbon and a hydrated magnesium silicate based clay mineral). This range gives a sufficient effect of dispersing the filler and hardly causes poor dispersion.

A desirable amount of a high molecular weight compound having the weight-average molecular weight of not less than 10000 is that a solid content thereof is in the range of 0.1 to 20 parts by weight (preferably 0.1 to 10 parts by weight) with respect to 100 parts by weight of a non-volatile matter of a filler. This range is preferable in view of sufficient formation of a protecting colloid and good thickening effect, and excellent workability.

The surfactants comprising a high molecular weight compound having the weight-average molecular weight of not less than 150 and less than 10000 include tripolyphosphate (such as sodium tripolyphosphoric acid, sodium tetraphosphoric acid or sodium hexametaphosphoric acid), sodium polyacrylic acid, polyvinyl alcohol, alkyl aryl sulfonate (such as sodium alkyl naphthalene sulfonic acid or sodium alkyl benzene sulfonic acid) and so on. The surfactants comprising a high molecular weight compound having the weight-average molecular weight of at least 10000 include synthetic polymers (such as polyvinyl alcohol, sodium polyacrylic acid or a styrene-maleic acid copolymer), the cellulose derivatives (such as a methyl cellulose, a hydroxyethyl cellulose or a carboxymethyl cellulose), and polyoxy alkylene aryl ether (such as polyoxyethylene phenol ether or polyoxybutylene nonyl phenol ether) and so on.

A resin is a main element of the synthetic resin composition. When the synthetic resin composition is impregnated into a cloth, the resin improves a dimensional accuracy by combining fibers which compose a cloth, and prevents fibers from being rent. Furthermore, the resin functions as a bonding agent for holding the additives such as a filler and so on, and fixing them to a cloth.

As for resins, a synthetic resin latex or a rubber latex is used. A synthetic resin latex comprises resin colloid particles as dispersoid and water as a dispersant. When a synthetic resin composition is dried, a synthetic resin latex effectively acts as a bonding agent by fusing particles each other. Examples of synthetic resin latexes include polyvinyl chloride latex, polyvinylidene chloride latex, polyurethane latex, acrylic resin latex, polyvinyl acetate latex, polyacrylonitrile latex, and modified resins and copolymers thereof. A preferable acrylic type resin is a polymer emulsion whose main element is acrylic (or methacrylic) ester. Acrylic (or methacrylic) esters are, for example, methyl (or methamethyl) acrylate, ethyl (or methaethyl) acrylate, butyl (or methabutyl) acrylate, acrylic (or methacrylic) 2-ethyl hexyl, acrylic (or methacrylic) glycidyl ester, acrylic (or methacrylic) 2-hydroxy ethyl and so on. An unsaturated monomer including an ethylenic linkage is used with the above acrylic (or methacrylic) ester, and it is possible to become a copolymer. The unsaturated monomers including an ethylene linkage are, for example, styrene, acrylonitrile (or methacrylonitrile), acrylic (or methacrylic) amid, N-methylol acrylic amid, vinyl acetate, vinyl propionic acid, vinyl chloride, vinylidene chloride, acrylic (or methacrylic) acid, itaconic acid, fumaric acid, crotonic acid, maleic acid and so on.

To be used with an ethylene unsaturated monomer, the content of acrylic (or methacrylic) ester is not less than 50% by weight. An acrylic type resin is preferably formed by an emulsion polymerization. For example, water, an ethylene unsaturated monomer, an emulsifying agent (sodium dodecyl benzene sulfonic acid, polyoxyethylene alkyl ether and so on) and a radical polymerization catalyst are added into a reacting vessel in which a nitrogen substitution is performed, and a heat stirring is performed to complete a polymerization at the predetermined temperature. A control for the particle diameter of an acrylic type resin is performed by adjusting the concentration of an emulsifying agent during the emulsion polymerization.

The rubber latexes are, for example, natural rubber, styrene-butadiene rubber, acrylonitrile rubber, acrylonitrile-butadiene rubber, isoprene isobutylene rubber, polyisobutylene, polybutadiene, polyisoprene, polychloroprene, polyethylene propylene and so on. It is preferable that a latex of a butadiene copolymer is used. A butadiene copolymer preferably contains 20 to 80 parts by weight of butadiene and 20 to 80 parts by weight of an ethylene unsaturated monomer which is able to copolymerize with butadiene. The ethylene unsaturated monomers are, for example, methacrylic ester, acrylic ester, styrene, acrylonitrile, methacrylonitrile, acrylic amid, N-methylol acrylic amid, vinyl acetate, vinyl chloride, vinylidene chloride, acrylic acid, itaconic acid, fumaric acid, crotonic acid, maleic acid and so on.

Considering the light fastness and the heat resistance which are required for an interior material for a vehicle, the copolymerizing composition of a butadiene copolymer is 20 to 60% by weight of butadiene, 40 to 80% by weight of acrylic (or methacrylic) ester and 0 to 20% by weight of an ethylene unsaturated monomer.

In the present invention, at least one of the above synthetic resins and the above rubber latexes is used.

Among the above resins, the glass-transition temperature (Tg) is preferably in the range of −70° to +20° C. When the glass-transition temperature is less than −70° C., a resin is too soft to coat a filler in forming a layer, so, the materiality and the treatment, for example, a function deteriorates or a layer is sticky, become problems. When the glass-transition temperature is more than +20° C., the resin is too hard. So, in case the resin is applied to a cloth and processed or used, a filler is lacked and a texture deteriorates. When the grass-transition temperature is in the range of −70° to +20° C., a resin has a good characteristics. The resins in which the grass-transition temperature is in the range of −70° to +20° C. are, for example, an acrylic type resin, ethylene-vinyl type acetate resin, polyurethane type resin, butadiene type resin and so on. In the present invention, at least one of the above resins is used.

In case a flame retardant is added to the synthetic resin composition, an acrylic type resin which contains 5 to 45% by weight of styrene and whose glass-transition temperature is in the range of −20° C. to +20° C., is preferably used. By this, an interior material which are excellent in the formation, especially in the backing of a ceiling material, are obtained. Therefore, when an acrylic type resin whose main element is a copolymer comprising styrene and methacrylic ester, and in which the containing amount of styrene is 5 to 45% by weight, preferably 1 to 40% by weight, and whose glass-transition temperature is in the range of −20° to +20° C., is used (especially as a ceiling material), it doesn't become too hard or too soft, and the formation is good.

Among the above polymer latex, an acrylic type resin whose average particle diameter is 0.2 to 0.6 µm is desirably used. Such acrylic type resin is excellent in a formation and the flexibility of a layer, so the function doesn't deteriorate and the layer isn't sticky. Furthermore, it has no problem in the storage stability and the bonding strength.

In case a flame retardant is added to the synthetic resin composition, an acrylic copolymer in which the average particle diameter of a resin in a resin latex is 0.2 to 0.6 µm and whose glass-transition temperature is in the range of −55° to 0° C. is preferably used. By this, an interior material is excellent in the texture and the bonding strength, thereby performing an excellent backing for a seat. When a resin whose particle diameter is in the range of 0.2 to 0.6 µm is used, the deodorization is better and an odor of a resin is fewer as compared with another resin.

A filler is a functional material to perform various functions of an interior material. The fillers which work for removing an odor substance are an adsorbent and a deodorant such as a hydrated magnesium silicate based clay mineral, an activated carbon, zeolite, activated carbon fiber, silica gel and so on.

In the present invention, the above hydrated magnesium silicate based clay mineral and the above activated carbon are used as the fillers, so it is possible to antistatic as well as an odor efficiently.

The raw materials of activated carbon are a coconut hull, a charcoal, a brown coal, a marl, coal, a pulp and so on. In view of the deodorizing effect, it is preferable that the coconut hull is used as a raw material of the activated carbon.

The hydrated magnesium silicate based clay minerals are sepiolite, silotile, raflinite, falcondolite, palygorskite, and so on. So-called mountain cork, mountain wood, meerschaum, attapulgite correspond to the hydrated magnesium silicate based clay mineral. These are calcined at the temperature of 400° to 800° C., and they can be used.

The hydrated magnesium silicate based clay minerals can be used either in a powder, a particle or a plate. Especially, the hydrated magnesium silicate based clay mineral is desirably ground to the extent that its pore remains. An aggregation of a fine crystal whose length is not more than 10 µm and whose aspect ratio is not more than 100 is preferably used. They have a hydroxyl group which is rich in the reaction and the pores on their surface, and have a characteristics for deodorizing an odor and a moisture in an atmosphere.

A desirable proportion amount of the fillers, such as an activated carbon, a hydrated magnesium silicate based clay mineral and so on, is that a non-volatile matter of a filler is in the range of 50 to 200 parts by weight with respect to 100 parts by weight of a non-volatile matter of a resin. In this range, the function of a filler is fully performed and the natural characteristics of the synthetic resin composition, such as the improvement of a dimensional accuracy of a cloth and the prevention from the thread being rent, becomes good. When a filler, in which the hydrated magnesium silicate based clay mineral is used with an activated carbon, is used, a desirable proportion amount of a filler is that the activated carbon is in the range of 5 to 90 parts by weight (preferably 10 to 80 parts by weight) with respect to 100 parts by weight of a filler. In this range, an adsorbent characteristics of both substances is fully performed as the synergetic effect.

The synthetic resin composition is characterized that a resin, an activated carbon, a hydrated magnesium silicate based clay mineral, antimony oxide, and bromine diaryl oxide and/or bromide arene are dispersed into an aqueous medium by a surfactant.

A flame retardant can be added into the synthetic resin composition of the present invention to the extent that the special characteristics doesn't deteriorate.

The antimony oxide as an inorganic flame retardant are antimony trioxide and antimony pentoxide. The bromine diaryl oxide as an organic flame retardant are decabromodiphenyl oxide, hexabromophenyl oxide, pentabromophenyl oxide and so on. The bromide arene is hexabromobenzene.

The flame retardants are a phosphorus compound, a chlorine compound, a bromine compound, a guanidine compound, an antimony compound, a boron compound, an ammonium compound and so on. For example, monoammonium phosphate, diammonium phosphate, phosphoric triester, phosphorous ester, phosphonium salt, phosphoric triamide, chlorine paraffin, dechlorine, ammonium bromide, tetrabromobisphenol A, tetrabromoethane, hydrochloric guanidine, carbonic guanidine, phosphoric guanidine, phosphoric guanylic urea, antimony oxide, sodium tetraborate decahydrate (borax), ammonium sulfate, ammonium sulfamine acid and so on.

A mixed ratio of an inorganic flame retardant and an organic flame retardant is desirably as follows: the total amount of a non-volatile matter of activated carbon and a non-volatile matter of a hydrated magnesium silicate based clay mineral is 50 to 200 parts by weight with respect to 100 parts by weight of a non-volatile matter of a resin, and the total amount of a non-volatile matter of an inorganic flame retardant and a non-volatile matter of an organic flame retardant is 30 to 100 parts by weight with respect to 100 parts by weight of a non-volatile matter of a resin. It is preferable that an inorganic flame retardant is 20 to 50 parts by weight, more preferably, 25 to 35 parts by weight.

When the total amount of the activated carbon and the hydrated magnesium silicate based clay mineral is 50 to 200 parts by weight, it is preferable that the containing ratio of activated carbon is 10 to 80 parts by weight.

The present invention discloses the synthetic resin composition in which a rubber and a deodorant such as activated carbon or a hydrated magnesium silicate based clay mineral are dispersed into an aqueous medium by a surfactant. The characteristics of the synthetic resin composition is to contain a stabilizer comprising a semicarbazide type compound.

A semicarbazide type compound is shown as the following formula:

herein R is $(CH_2)_n$ or $C_6H_4CH_2C_6H_4$; $R_1$, $R_2$, $R_3$, $R_4$ is a hydrogen atom or an alkyl group whose carbon number is 1 to 12; n is an integral number 1 to 12.

The semicarbazide type compounds are, for example, 1, 6-hexamethylenebis (N, N-dimethyl semicarbazide) [shown in the formula (1)]:

and 1,1,1', 1'-tetramethyl 4, 4'-(methylene-di-P-phenylene) disemicarbazide [shown in the formula (2)]:

A multiple kinds of the above semicarbazide type compounds can be mixed. As for a layer of a rubber made of a synthetic resin composition by adding a semicarbazide type compound, an organization isn't obvious, but the light fastness and the heat resistance improves. Then the light fastness and the heat resistance of an interior material improves.

A proportion amount of a stabilizer is 1 to 10 parts by weight with respect to 100 parts by weight of a non-volatile matter of a rubber, more preferably, 1 to 5 parts by weight.

Other additives, such as an electrical conductive agent and a valcanizing agent, can be added to the synthetic resin composition. The electrical conductive agent are an electrical conductive macro molecule such as an electrical conductive carbon black, poly acetylene or poly pyrrole; a metal such as copper, aluminum or a stainless steel; and an electrical conductive fiber substance such as a carbon fiber or a metal fiber.

A method for producing the synthetic resin composition of the present invention is not limited, so any method can be used for producing the same. For example, when a clay mineral and activated carbon is used as a filler, the filler is mixed by the dry blending, and is kneaded with water in which a surfactant is dissolved. Then, a resin latex is added and kneaded once more, thereby obtaining the synthetic resin composition. A filler and a surfactant are mixed by the dry blending, and are dispersed into water, then resin latex can be added and kneaded. A filler and a surfactant are mixed by the dry blending, then resin latex which is diluted with water can be added and kneaded.

A surfactant can be used in several times as for the above-described methods. For example, at first, a surfactant is used as a dispersant and a forming protecting colloid in a little amount; then, a surfactant is used as a thickener for the synthetic resin composition obtained by adding a resin latex, thereby adjusting the viscosity.

Concerning the productivity in the coating process and the drying process, the labor effectiveness and the storage stability, the amount of a non-volatile matter of the synthetic resin composition is prepared in the range of 30 to 60% by weight, more preferably, 35 to 50% by weight.

The synthetic resin composition of the present invention can be used as an interior material for a vehicle, especially for a ceiling material after the coating and the drying. It also can be used for a housing carpet, a wall paper and a ceiling material.

An interior material of the present invention for deodorizing an odor is characterized that the synthetic resin composition in which a resin and a filler are dispersed into an aqueous medium by two kinds of surfactant, one comprising high molecular weight compound having the weight-average molecular weight of at least 10000 and the other comprising high molecular weight compound having the weight-average molecular weight of not less than 150 and less than 10000, is applied to a base material, then drying.

More preferably, in an interior material having the performance of the deodorization, the above synthetic resin composition is bubbled by the machine bubbling, and is coated to a base material, then drying. After a non-volatile matter of the synthetic resin composition is prepared to 30 to 50% by weight, it is fully bubbled with the air blown into by the agitator machine such as an oaks mixer.

Usually, a multiplying factor of a bubbling is in the range of 1.5 to 6 times, preferably 1.5 to 4 times in view of the performance of the deodorization of an odor and the bonding ability.

As is needed, sodium lauric sulfate ester, ammonium higher fatty acid such as ammonium stearate, fluoro surfactant or aliphatic alcohol, which are known as the bubbling agents, are added in a proper amount, and can be bubbled by the machine. These bubbling agents are likely to deteriorate the performance of the deodorization of a filler such as a hydrated magnesium silicate based clay mineral or an activated carbon, so the usage of bubbling agents is limited to minimum. So-called chemical bubbling is not preferable because the adsorbent characteristics deteriorates.

When a polyurethane type resin is used as a resin component, the total amount of a non-volatile matter of activated carbon and a hydrated magnesium silicate based clay mineral is 50 to 200 parts by weight with respect to 100 parts by weight of a non-volatile matter of a urethane type resin. The total amount of a non-volatile matter of an inorganic flame retardant is 100 to 200 parts by weight.

A containing ratio of activated carbon is desirably 10 to 80% by weight in the total amount of activated carbon and a hydrated magnesium silicate based clay mineral. An amount of an inorganic flame retardant is 20 to 50% by weight, more preferably 25 to 35% by weight, in the total amount of an inorganic and an organic flame retardant. It is preferable that a non-volatile matter of the synthetic resin composition is prepared and bubbled in the range of 30 to 60% by weight, more preferably, 35 to 50% by weight.

The bubbled synthetic resin composition is preferably used as an interior material for a vehicle after the coating and the drying.

The amount of the coating is preferably 30 to 200 $g/m^2$ in an amount of a non-volatile matter. When the amount of the coating is 30 to 200 $g/m^2$, the bonding strength of a layer is enough and the texture is also well.

When the bubbling and the coating are done, it is preferable that polyurethane is used as a resin contained in the synthetic resin composition. The polyurethane type resin is aquatic and is obtained by reacting a polyhydroxy compound and an excess poly isocyanate, and furthermore reacting a chain-extending agent having more than two of the activated hydrogen on the condition that the ratio of NCO to H is 1:1.5. The component of the polyurethane type resin is performed to be water-soluble and an emulsion by introducing an ionicity group such as $—COO^-$, $—SO_3^-$, $—PO_4^-$, $—N^+$ and so on.

A polyhydroxy compound contains a hydroxyl group on both ends and a mean molecular weight is about 500 to 5000, and polyether, polyester polyole, polycarbonate is preferably used.

When the synthetic resin composition in which a flame retardant is prepared by a polyurethane type resin is used as a backing material, a flame retardation improves without deteriorating the deodorization.

The surfactant of the present invention contains a first high molecular weight compound having the weight-average molecular weight of not less than 150 and less than 10000, and a second high molecular weight compound having the weight-average molecular weight of at least 10000, so the surfactant functions as a dispersant and improves the dispersibility of a filler. The aqueous solution of the surfactant having the weight-average molecular weight of not less than 150 and less than 10000 shows a low viscosity, so it is easy to immerse into the clearance of a secondary particle, and the deflocculation and the dispersion of a secondary particle is sufficiently performed. As the result, a filler is dispersed into a primary particle or a small agglomeration lump, so it is hard to precipitate though the viscosity is not high. Therefore, the viscosity doesn't increase though the concentration of a non-volatile matter increases. Furthermore, the storage stability at the room temperature improves. Moreover, the dispersibility is maintained even if a flame retardant and a stabilizer as non-volatile matters are added.

A stabilizing organization of a semicarbazide type compound is unclear. When the stabilizer is prepared in the synthetic resin composition and an interior material is formed by coating the synthetic resin composition to a cloth, a layer of a resin improves the light fastness and the heat resistance. Therefore, the texture of an interior material is maintained for a long time, and an ability for preventing the deodorization doesn't deteriorate.

When the synthetic resin composition is bubbled by the machine and is coated to a cloth, the deodorization improves in spite of a little amount of the coating, and an interior material in which the bonding strength and the feeling is good, is obtained.

DETAILED DESCRIPTION OF THE PREFERRED EMBODIMENTS

The preferred embodiments of this invention will be hereinafter described.

First Preferred Embodiment

A first preferred embodiment according to this invention employed a polymer emulsion containing 50% by weight of a non-volatile matter in which a resin composition was 80% by weight of butyl acrylate, 18% by weight of methyl acrylate and 2% by weight of acrylic acid, and in which the glass-transition temperature (Tg; the value measured by the machine for measuring a dynamic viscoelasticity "Leo Metrict PSA II" manufactured by Leo Metric Company, hereinafter described the same) was −25° C.; thereby obtaining the synthetic resin composition used for an interior material as follows.

90 parts by weight of sepiolite whose grain size was not more than 100 mesh and 90 parts by weight of activated carbon whose grain size was not more than 250 mesh were mixed by the dry blending. 0.9 parts by weight of sodium alkyl naphthalene sulfonic acid as a surfactant having the weight-average molecular weight of 342 and 5 parts by weight of a carboxymethyl cellulose having the weight-average molecular weight of 130000 were dissolved into 366 parts by weight of water and were mixed by a biaxial blender. After that, 200 parts by weight of the above-mentioned acrylic emulsion containing 50% by weight of a non-volatile matter was added and mixed to obtain the synthetic resin composition which contained 38% by weight of a non-volatile matter.

The obtained synthetic resin composition showed no alteration more than one month after the synthetic resin composition was let alone at the room temperature (25° C.).

Figure 1:
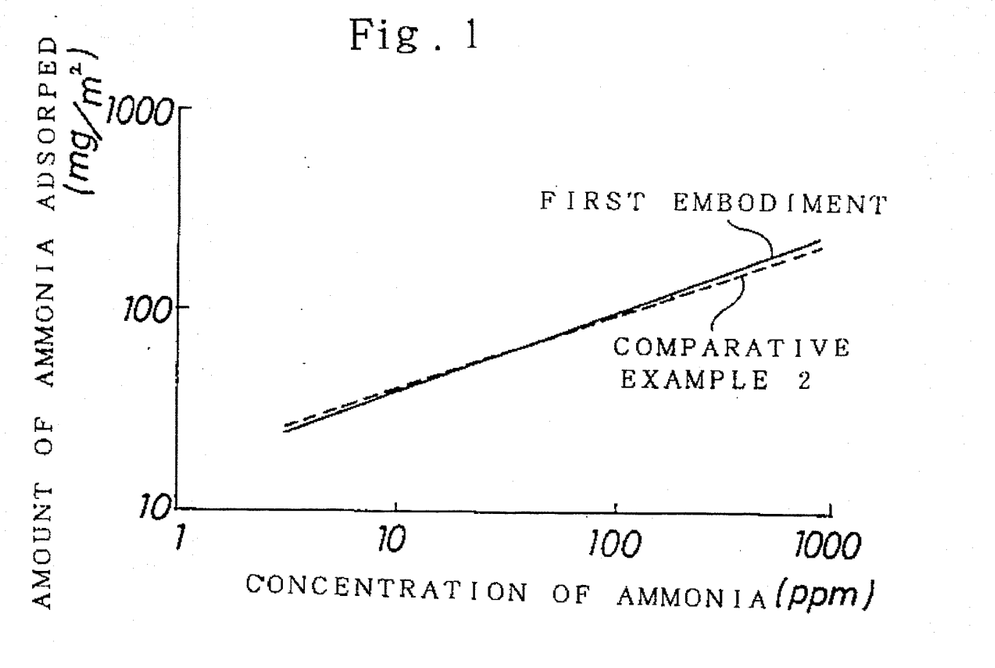
FIG. 1 is a diagram for showing an ammonia adsorption amount of the second preferred embodiment in the present invention and of the comparative example 2.
Figure 2:
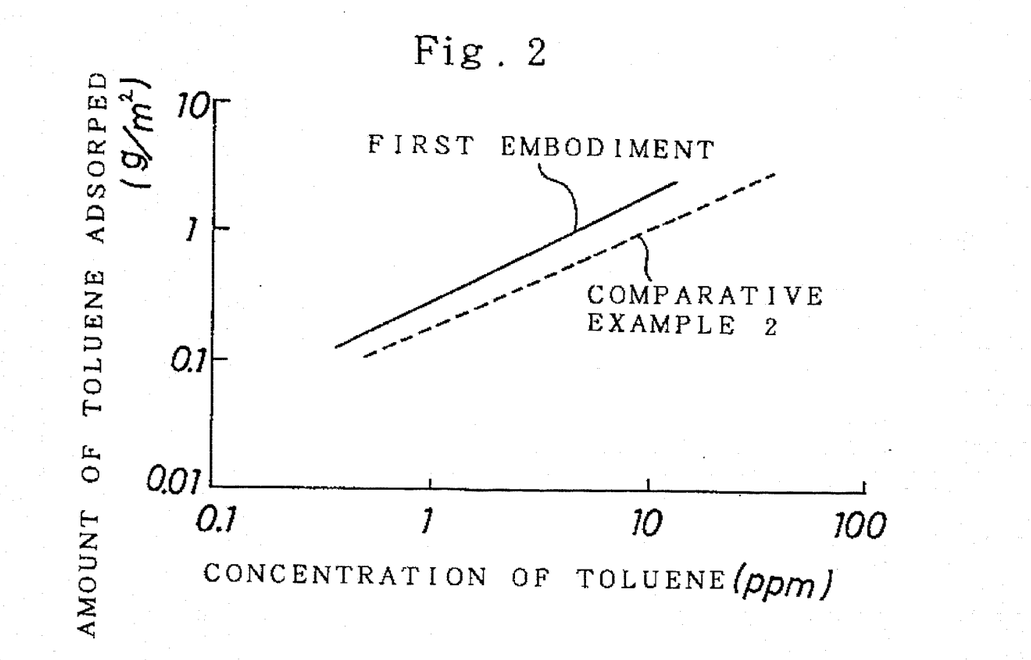
FIG. 2 is a diagram for showing a toluene adsorption amount of the second preferred embodiment in the present invention and of the comparative example 2.

The obtained synthetic resin composition was coated by a doctor blade to a rear face of a fabric comprising a polyester fiber in such a manner that 110 g/m² of a non-volatile matter was contained, and was dried in a hot air drier at 130° C. for 20 minutes to obtain an interior material for a vehicle. To evaluate the performance of the deodorization for the obtained synthetic resin composition, the relationship between the concentration and the amount of ammonia adsorped is shown in FIG. 1. The relationship between the concentration and the amount of toluene adsorped is shown in FIG. 2.

Second Preferred Embodiment

A second preferred embodiment employed the same compositions and the same manner as described in the first embodiment except that 0.9 parts by weight of polyoxyethylene nonyl phenol ether as a surfactant having the weight-average molecular weight of 308 was used instead of sodium alkyl naphthalene sulfonic acid; thereby obtaining the synthetic resin composition which contained 38% by weight of a non-volatile matter.

Third Preferred Embodiment

A third preferred embodiment employed the same composition and the same manner as described in the first embodiment except that 0.9 parts by weight of sodium polyacrylic acid as a surfactant having the weight-average molecular weight of 4000 was used instead of sodium alkyl naphthalene sulfonic acid; thereby obtaining the synthetic resin composition which contains 38% by weight of a non-volatile matter.

Fourth Preferred Embodiment

A fourth preferred embodiment employed the same compositions and the same manner as described in the first embodiment except that a SBR latex containing 50% by weight of a non-volatile matter in which a resin composition was 50% by weight of styrene, 47% by weight of butadiene and 3% by weight of acrylic acid, and in which the glass-transition temperature was −35° C. was used; thereby obtaining the synthetic resin composition which contained 38% by weight of a non-volatile matter.

Fifth Preferred Embodiment

A fifth preferred embodiment employed the same compositions and the same manner as described in the first embodiment except that an ethylene vinyl acetate copolymer containing 50% by weight of a non-volatile matter in which a resin composition was 80% by weight of vinyl acetate and 20% by weight of ethylene, and in which the glass-transition temperature was −50° C. was used; thereby obtaining the synthetic resin composition which contained 38% by weight of a non-volatile matter.

Sixth Preferred Embodiment

A sixth preferred embodiment employed the same compositions and the same manner as described in the first embodiment except that a polyurethane latex containing 50% by weight of a non-volatile matter and the glass-transition temperature being −15° C. which was obtained by reacting dimethylol propionic acid, tolylenediisocyanate and a polyester comprising 1, 4-butanediol/adipic acid in a solvent, and by performing the chain elongation and water dispersion in water contained anhydrous piperidine and triethyl amine, then removing a solvent was used; thereby obtaining the synthetic resin composition which contains 38% by weight of a non-volatile matter.

Seventh Preferred Embodiment

A seventh preferred embodiment employed the same compositions and the same manner as described in the first embodiment except that an acrylic emulsion containing 50% by weight of a non-volatile matter in which a resin composition was 40% by weight of butyl acrylate, 58% by weight of methyl methacrylate and 2% by weight of acrylic acid, and in which the glass-transition temperature was +27° C. was used; thereby obtaining the synthetic resin composition which contained 38% by weight of a non-volatile matter.

Eighth Preferred Embodiment

A eighth preferred embodiment employed the same compositions and the same manners described in the first embodiment except that a SBR latex containing 50% by weight of a non-volatile matter in which a resin composition was 75% by weight of styrene, 22% by weight of butadiene and 3% by weight of acrylic acid, and in which the glass-transition temperature was +33° C. was used instead of an acrylic emulsion; thereby obtaining the synthetic resin composition which contained 38% by weight of a non-volatile matter.

As seen from the embodiments 1 to 8, the synthetic resin compositions contained 38% by weight of a non-volatile matter, and the dispersibility of a non-volatile matter was good.

The synthetic resin compositions as described in the embodiments 1 to 8 were coated to a textile in a usual manner. The observation of the texture and the condition was made in case the synthetic resin composition was used as an interior material for a vehicle. The results are shown in Table 1.

TABLE 1

| Embodiments | Texture of the Coating | Condition of a Resin Layer |
| --- | --- | --- |
| 1 | Good | No peeling off |
| 2 | Good | No peeling off |
| 3 | Good | No peeling off |
| 4 | Good | No peeling off |
| 5 | Good | No peeling off |
| 6 | Good | No peeling off |
| 7 | Slightly hard | Peeling off |
| 8 | Slightly hard | Peeling off |

As is obvious from Table 1, the embodiments 1 to 8 disclose the synthetic resin compositions in which the texture and the condition for a vehicle are good. Especially, the synthetic resin materials disclosed in the embodiments 1 to 6 are excellent.

The performance of the deodorization of the synthetic resin materials disclosed in the embodiments 2 to 8 were almost the same as that in the first embodiment.

Comparative Example 1

A comparative example 1 employed the same compositions and the same manner as described in the first embodiment except that 0.9 parts by weight of sodium alkyl naphthalene sulfonic acid as a lower molecular amount of a surfactant was not used. In this example, the agglomeration occurred during the agitation of the sample, so the desired synthetic resin composition couldn't be obtained.

Comparative Example 2

A comparative example 2 employed the same compositions and the same manner as described in the first embodiment except that 800 parts by weight of water was used instead of 0.9 parts by weight of sodium alkyl naphthalene sulfonic acid as a low molecular amount of a surfactant; thereby obtaining the synthetic resin composition which contained 24% by weight of a non-volatile matter.

The viscosity was reduced by half two weeks after the obtained synthetic resin composition had been let alone at the room temperature (25° C.). For the purpose of making the same interior material for a vehicle as that in the first embodiment, especially, for the purpose of making the same layer thickness as that in the first embodiment, the coating was repeatedly needed. Furthermore, the drying was not fully performed under the same condition as that in the first embodiment, so the drying was performed once more, thereby obtaining the interior material for a vehicle. The performance of the deodorization of the obtained interior material was evaluated in the same manner as that in the first embodiment. FIG. 1 shows the amount of ammonia adsorped and FIG. 2 shows the amount of toluene adsorped.

As seen from FIGS. 1 and 2, amount of ammonia adsorped of the first embodiment is the same as that of the comparative example 2, but amount of toluene adsorped of the first embodiment is more than that of the comparative example 2.

Ninth Preferred Embodiment 35 parts by weight of the deionization water, 0.3 parts by weight of sodium lauryl sulfate, 4 parts by weight of polyoxyethylene nonyl phenol ether (HLB being about 17), 80 parts by weight of butyl acrylate, 17 parts by weight of methyl methacrylate, 2 parts by weight of methacrylic acid and 1 parts by weight of glycidyl methacrylate were mixed to prepare a mixed solution (B). 0.4 parts by weight of ammonium persulfate was dissolved into 7 parts by weight of the deionizing water to prepare a catalytic solution (C).

A ninth preferred embodiment employed a reacting vessel with an agitator made by a stainless steel to which a condenser, a thermometer and a dripping loto were attached. After the nitrogen substitution was performed in the vessel, 60 parts by weight of the deionization water (A) was added. While the temperature in the reacting vessel was being kept at 80° C. and the agitation was being performed, 5% by weight of the mixed solution (B) and 10% by weight of the catalytic solution (C) were added. After the temperature in the reacting vessel was being kept at 80° C. and the agitation was being performed for 15 minutes, 95% by weight of the mixed solution (B) and 90% by weight of the catalytic solution (C) were dripped for 180 minutes, and the polymerization was performed. During this time, the temperature in the reacting vessel was being kept from 78° to 82° C. After the dripping, the agitation was being performed for 30 minutes at the same temperature. The contents in the vessel were cooled to 30° C., and adjusted to pH 7 to 8 by 25% of an aqueous ammonia, then filtered by a 200 mesh wire net, thereby obtaining an acrylic type resin solution.

The density of the obtained acrylic type resin was 50.2%. The average particle diameter of the acrylic type resin was 0.35 µm, which was measured by "Particle Size Analyzer LA- 500" manufactured by Horiba Seisakusho. The glass-transition temperature was −20° C.

The same compositions and the same manner as described in the first embodiment was employed except that the above acrylic type resin was used instead of an acrylic emulsion, thereby obtaining the synthetic resin composition which contained 38% by weight of a non-volatile matter, and whose viscosity was 5000 cps (20° C.). The observation of the stability of the obtained synthetic resin composition was made. The result is shown in Table 2.

The obtained synthetic resin composition was coated by a doctor blade to a rear face of a fabric comprising a polyester fiber in such a manner that 110 g/m² of a non-volatile matter was contained, and was dried in a hot air drier at 130° C. for 20 minutes to obtain an interior material for a vehicle. The performance of the deodorization and the texture of the obtained synthetic resin composition were evaluated as follows.

The texture depends on the touching. The performance of the deodorization was evaluated as follows. The four boxes made of acrylic, in which one side was 45 cm and whose configuration was a cube, were prepared. As for one box of them, the sample of the obtained interior material (40 cm×40 cm) were attached to the inside of a ceiling part in such a manner that the face coated with the synthetic resin composition was connected to an acrylic plate, and the box was sealed. As for another box, a standard sample were attached to the inside of a ceiling part in such a manner that the face coated with the synthetic resin composition was connected to an acrylic plate, and the box was sealed. In each of these two boxes, a paper-covered tobacco (Hi-lite; manufactured by Japan Tobacco Industrial Company, a name of goods) was burned by 2 cm and was let alone for 30 minutes. Then, these samples were taken out, and after 1 hour, each of them was put on the bottom of each of the other two boxes. These boxes were sealed and the samples were let alone for 1 hour. The sensory odor intensity in each box was compared by 12 panel and the dominance for the intensity was evaluated. The evaluation was made by 3 grades (O, Δ, X) and the lowest intensity of an odor was evaluated as O. The result is shown in Table 2.

Tenth Preferred Embodiment

A tenth preferred embodiment employed the same compositions and the same manner as described in the ninth embodiment except that the composition of (A) comprised 60.5 parts by weight of the deionizing water and 0.5 parts by weight of sodium lauryl sulfate; thereby obtaining an acrylic type resin which contained 50.1% by weight of a non-volatile matter. The average particle diameter of the acrylic type resin was 0.15 µm. The glass-transition temperature was −20° C.

The synthetic resin composition was made by the above acrylic type resin in the same manner as the ninth embodiment, then obtaining an interior material for a vehicle. The performance of this interior material was evaluated and the result is shown in Table 2.

Eleventh Preferred Embodiment

A eleventh preferred embodiment employed the same compositions and the same manner as described in the ninth embodiment except that the composition of (A) comprises 61 parts by weight of the deionizing water and 1 parts by weight of sodium sulfate; thereby obtaining an acrylic type resin which contained 50.2% by weight of a non-volatile matter. The average particle diameter of the acrylic type resin was 0.63 μm. The glass-transition temperature was −20° C.

The synthetic resin composition was made by the above acrylic type resin in the same manner as the ninth embodiment, then obtaining an interior material for a vehicle. The performance of this interior material was evaluated and the result is shown in Table 2.

Twelfth Preferred Embodiment

A twelfth preferred embodiment employed the same compositions and the same manner as described in the ninth embodiment except that the composition of (B) comprised 60 parts by weight of 2-ethyl hexyl acrylate, 38 parts by weight of butyl acrylate, 1 parts by weight of methacrylic acid and 1 parts by weight of glycidyl methacrylate; thereby obtaining an acrylic type resin which contained 50.0% by weight of a non-volatile matter. The average particle diameter of the acrylic type resin was 0.40 μm. The glass-transition temperature was −58° C.

The synthetic resin composition was made by the above acrylic type resin in the same manner as that in the ninth embodiment, then obtaining an interior material for a vehicle. The performance of this interior material was evaluated and the result is shown in Table 2.

Thirteenth Preferred Embodiment

A thirteenth preferred embodiment employed the same compositions and the same manner as described in the ninth embodiment except that the composition of (B) comprised 40 parts by weight of butyl acrylate, 17 parts by weight of methyl methacrylate, 2 parts by weight of methacrylic acid and 1 parts by weight of glycidyl methacrylate; thereby obtaining an acrylic type resin which contained 50.0% by weight of a non-volatile matter. The average particle diameter of the acrylic type resin was 0.33 μm. The glass-transition temperature was +28° C.

The synthetic resin composition was made by the above acrylic type resin in the same manner as that in the ninth embodiment, then obtaining an interior material for a vehicle. The performance of this interior material was evaluated and the result is shown in Table 2.

TABLE 2

| Embodiments | 9 | 10 | 11 | 12 | 13 |
|---|---|---|---|---|---|
| Stability of the Synthetic Resin Composition | | | | | |
| Just after the Preparation (Viscosity; cps) | 5000 | 5050 | 5000 | 5030 | 5100 |
| 50° C. × 2 Weeks later (Viscosity; cps) | 5050 | 6800 | 8500 | 5100 | 5600 |
| 50° C. × 4 Weeks later (Viscosity; cps) | 5050 | 8300 | gelatilization | 5200 | 5800 |
| Characteristics of an Interior Material | | | | | |
| Texture | Good | Good | Good | Good | Hard |
| Effect of the Deodorization | O | Δ | Δ | O | O |

As is obvious from Table 2, the embodiments 9 to 13 disclose the synthetic resin compositions in which the texture and the condition for a vehicle are good. Especially, the synthetic resin material disclosed in the ninth embodiment is excellent.

Fourteenth Preferred Embodiment 200 parts by weight of an acrylic type resin emulsion containing a resin, a filler and a surfactant which was used in the first embodiment and 100 parts by weight of aqueous dispersion of a flame retardant containing antimony trioxide and decabromodiphenyl oxide (the ratio of a non-volatile matter being 1:2, aqueous dispersion containing 60% by weight of a non-volatile matter) were mixed and moreover water was added to obtain the synthetic resin composition which contained 40% by weight of a non-volatile matter. The obtained synthetic resin composition was coated by a doctor blade to a rear face of a fabric comprising a polyester fiber in such a manner that 130 g/m$^2$ of a non-volatile matter was contained, and was dried to obtain an interior material for a vehicle.

The performance of the deodorization was evaluated by the same sensory test as that in the ninth embodiment. The result is shown in Table 3.

The burning speed in a vertical direction of an interior material was measured based on FMVSS-302, and the flame retardation was evaluated. The result is shown in Table 3. In Table 3, the sample whose burning speed is not more than 10 cm/min. is evaluated as O.

FMVSS is an abbreviation of Federal Motor Vehicle Safety Standards.

Fifteenth Preferred Embodiment

A fifteenth preferred embodiment employed the same compositions and the same manner as described in the fourteenth embodiment except that antimony trioxide and hexabromophenyl oxide which were dispersed in water in such a manner that the ratio of a non-volatile matter was 1:2.5 and 60% by weight of a non-volatile matter was contained were used as flame retardants; thereby obtaining the synthetic resin composition.

The synthetic resin composition was applied to a fabric and dried to obtain an interior material in the same manner as that in the fourteenth embodiment. The performance of the deodorization and the flame retardation were evaluated by the same method as that in the fourteenth embodiment. The result is shown in Table 3.

Sixteenth Preferred Embodiment

A sixteenth preferred embodiment employed the same compositions and the same manner as described in the fourteenth embodiment except that antimony trioxide and pentabromophenyl oxide which were dispersed in water in such a manner that the ratio of a non-volatile matter was 1:2.5 and 60% by weight of a non-volatile matter was contained were used as flame retardants; thereby obtaining the synthetic resin composition.

The synthetic resin composition was applied to a fabric and dried to obtain an interior material in the same manner as that in the fourteenth embodiment. The performance of the deodorization and the flame retardation were evaluated by the same method as that in the fourteenth embodiment. The result is shown in Table 3.

Seventeenth Preferred Embodiment

A seventeenth preferred embodiment employed the same compositions and the same manner as described in the fourteenth embodiment except that antimony pentoxide and hexabromophenyl oxide which were dispersed in water in such a manner that the ratio of a non-volatile matter was 1:2.5 and 60% by weight of a non-volatile matter was contained were used as flame retardants; thereby obtaining the synthetic resin composition.

The synthetic resin composition was applied to a fabric and dried to obtain an interior material in the same manner as that in the fourteenth embodiment. The performance of the deodorization and the flame retardation were evaluated by the same method as that in the fourteenth embodiment. The result is shown in Table 3.

Eighteenth Preferred Embodiment

An eighteenth preferred embodiment employed the same compositions and the same manner as described in the fourteenth embodiment except that the synthetic resin which was used in the fourth embodiment was used; thereby obtaining the synthetic resin composition.

The synthetic resin composition was applied to a fabric and dried to obtain an interior material in the same manner as that in the fourteenth embodiment. The performance of the deodorization and the flame retardation were evaluated by the same method as that in the fourteenth embodiment. The result is shown in Table 3.

Nineteenth Preferred Embodiment

A nineteenth preferred embodiment employed the same compositions and the same manner as described in the fourteenth embodiment except that the synthetic resin which was used in the sixth embodiment was used; thereby obtaining the synthetic resin composition.

The synthetic resin composition was applied to a fabric and dried to obtain an interior material in the same manner as that in the fourteenth embodiment. The performance of the deodorization and the flame retardation were evaluated by the same method as that in the fourteenth embodiment. The result is shown in Table 3.

Comparative Example 3

A comparative example 3 employed the same compositions and the same manner as described in the fourteenth embodiment except that antimony trioxide and tetrabromobisphenol A which were dispersed in water in such a manner that the ratio of a non-volatile matter was 1:3 and 60% by weight of a non-volatile matter was contained were used as flame retardants; thereby obtaining the synthetic resin composition.

The synthetic resin composition was applied to a fabric and dried to obtain an interior material in the same manner as that in the fourteenth embodiment. The performance of the deodorization and the flame retardation were evaluated by the same method as that in the fourteenth embodiment. The result is shown in Table 3.

Comparative Example 4

A comparative example 4 employed the same compositions and the same manner as described in the eighteenth embodiment except that antimony trioxide and tetrabromobisphenol A ethylene oxide additives which were dispersed in water in such a manner that the ratio of a non-volatile matter was 1:3 and 60% by weight of a non-volatile matter was contained were used as flame retardants; thereby obtaining the synthetic resin composition.

The synthetic resin composition was applied to a fabric and dried to obtain an interior material in the same manner as that in the fourteenth embodiment. The performance of the deodorization and the flame retardation were evaluated by the same method as that in the fourteenth embodiment. The result is shown in Table 3.

Comparative Example 5

A comparative example 5 employed the same compositions and the same manner as described in the nineteenth embodiment except that antimony pentoxide and tetrabromo anhydrous phthalic acid which were dispersed in water in such a manner that the ratio of a non-volatile matter was 1:3 and 60% by weight of a non-volatile matter was contained were used as flame retardants; thereby obtaining the synthetic resin composition.

The synthetic resin composition was applied to a fabric and dried to obtain an interior material in the same manner as that in the fourteenth embodiment. The performance of the deodorization and the flame retardation were evaluated by the same method as that in the fourteenth embodiment. The result is shown in Table 3.

TABLE 3

|  | Embodiments 14 to 19 | Comparative Examples 3 to 5 |
| --- | --- | --- |
| Deodorization | ◯ | Δ~X |
| Flame Retardation | ◯ | ◯ |

The interior material disclosed in the embodiments 14 to 19 show the good performance of the deodorization and the high flame retardation. On the other hand, an interior material disclosed in the comparative examples 3 to 5 show only the high flame retardation, not the good performance of the deodorization.

Twentieth Preferred Embodiment

A twentieth preferred embodiment according to the fourteenth embodiment employed an acrylic type emulsion in which a resin composition was 65% by weight of butyl acrylate, 35% by weight of styrene and 2% by weight of acrylic acid, and in which the glass-transition temperature was −5° C.; thereby obtaining the synthetic resin composition which was used for the backing to an interior material as follows.

90 parts by weight of sepiolite whose grain size was not more than 100 mesh and 90 parts by weight of activated carbon whose grain size was not more than 250 mesh were mixed by the dry blending. 0.9 parts by weight of sodium alkyl naphthalene sulfonic acid as a surfactant having the weight-average molecular weight of 342 and 5 parts by weight of a carboxymethyl cellulose having the weight-average molecular weight of 130000 were dissolved into 366 parts by weight of water and were mixed by a biaxial blender.

After that, 200 parts by weight of the above-mentioned acrylic type emulsion containing 50% by weight of a non-volatile matter and 100 parts by weight of aqueous dispersion of a flame retardant comprising antimony trioxide and decabromodiphenyl oxide, (the ratio of a non-volatile matter being 1:2, aqueous dispersion containing 60% by weight of a non-volatile matter) were added and mixed, furthermore water was added to obtain the synthetic resin composition which contained 38% by weight of a non-volatile matter.

The obtained synthetic resin composition was coated by a doctor blade to a rear face of a fabric comprising a polyester fiber in such a manner that 80 g/m$^2$ of a non-volatile matter was contained, and was dried in a hot air drier at 130° C. for 20 minutes to obtain an interior material for a vehicle. The performance of the deodorization of the obtained interior material was evaluated by the same method as that in the fourteenth embodiment.

The burning speed was measured based on FMVSS-302 in the same manner as that in the fourteenth embodiment, and the flame retardation was evaluated by the measured burning speed.

To examine the formation as a ceiling material for a vehicle, the bonding sheet was inserted between the obtained interior material and a ceiling base material, and this layered object was formed by the press machine. The formation of the interior material and the base material was evaluated and the result is shown in Table 4.

Comparative Example 6

A comparative example 6 employed the same compositions and the same manner as described in the twentieth embodiment except that 35% by weight of methyl methacrylate was used instead of styrene; thereby obtaining the same interior material as that in the twentieth embodiment.

The performance of the deodorization, the flame retardation and the formation were evaluated by the same method as that in the twentieth embodiment. The result is shown in Table 4.

Comparative Example 7

A comparative example 7 employed the same compositions and the same manner as described in the twentieth embodiment except that an acrylic type emulsion in which a resin composition was 80% by weight of butylacrylate, 18% by weight of styrene and 2% by weight of acrylic acid, and in which the glass-transition temperature was −25° C. was used; thereby obtaining the same interior material as that in the twentieth embodiment.

The performance of the deodorization, the flame retardation and the formation were evaluated by the same method as that in the twentieth embodiment. The result is shown in Table 4.

Comparative Example 8

A comparative example 8 employed the same compositions and the same manner as described in the twentieth embodiment except that an acrylic type emulsion in which a resin composition was 35% by weight of butylacrylate, 63% by weight of styrene and 2% by weight of acrylic acid, and in which the glass-transition temperature was +34 C. was used; thereby obtaining the same interior material as that in the twentieth embodiment.

The performance of the deodorization, the flame retardation and the formation were evaluated by the same method as that in the twentieth embodiment. The result is shown in Table 4.

TABLE 4

|  | Embodiment | Comparative Examples | | |
| --- | --- | --- | --- | --- |
|  | 20 | 6 | 7 | 8 |
| Deodorization | ◯ | ◯ | ◯ | △ |
| Flame Retardation | ◯ | ◯ | ◯ | ◯ |
| Formation | ◯ | X | X | △ |

Concerning the interior material described in the twentieth embodiment, the performance of the deodorization, the flame retardation and the formation were good. As for an interior material in which the synthetic resin composition (not comprising styrene) was used as a backing material as is described in the comparative example 6, the performance of the deodorization and the flame retardation were good, but the formation was poor. So, it is unsuitable for a ceiling material which especially needs for the formation.

As for an interior material in which the synthetic resin composition (the glass-transition temperature being −25° C., not more than −20° C.) was used for the backing described in the comparative example 7, the performance of the deodorization and the flame retardation were good, but the formation was poor. So, it is unsuitable for a ceiling material which especially needs for the formation.

As for an interior material in which the synthetic resin composition (the glass-transition temperature being +34° C., more than +20° C.) was used for the backing described in the comparative example 8, the flame retardant was good, but the performance of the deodorization and the formation were little poor. So, it is unsuitable for a ceiling material which especially needs for the formation.

The synthetic resin composition described in the twentieth embodiment is suitable for a ceiling material which requires the performance of the deodorization, the flame retardation and the formation.

Twenty-first Preferred Embodiment

A twenty-first preferred embodiment according to this invention employed a resin emulsion containing 50% by weight of a non-volatile matter whose particle diameter was in the range of 0.2 to 0.6 μm, and in which a polymer composition was 80% by weight of butyl acrylate, 18% by weight of methyl acrylate and 2% by weight of acrylic acid, and in which the glass-transition temperature was −25° C.; thereby obtaining the synthetic resin composition which was used for the backing to an interior material as follows.

90 parts by weight of sepiolite whose grain size was not more than 100 mesh and 90 parts by weight of activated carbon whose grain size was not more than 250 mesh were mixed by a dry blending. 0.9 parts by weight of sodium alkyl naphthalene sulfonic acid as a surfactant having the weight-average molecular weight of 342 and 5 parts by weight of a carboxymethyl cellulose having the weight-average molecular weight of 130000 were dissolved into 366 parts by weight of water and mixed by a biaxial blender.

After that, 200 parts by weight of the above-mentioned acrylic type emulsion containing 50% by weight of a non-volatile matter and 100 parts by weight of aqueous dispersion of a flame retardant comprising antimony trioxide and decabromodiphenyl oxide, (the ratio of a non-volatile matter being 1:2, aqueous dispersion containing 60% by weight of a non-volatile matter) were added and mixed, furthermore water was added to obtain the synthetic resin composition which contained 40% by weight of a non-volatile matter.

The obtained synthetic resin composition was coated by a doctor blade to a rear face of a fabric comprising a polyester fiber in such a manner that 130 g/m² of a non-volatile matter was contained, and was dried in a hot air drier at 130° C. for 20 minutes to obtain an interior material for a vehicle.

The performance of the deodorization of the obtained interior material was evaluated by the same method as that in the fourteenth embodiment.

The burning speed was measured based on FMVSS-302 in the same manner as that in the fourteenth embodiment, and the flame retardation were evaluated by the measured burning speed.

The texture and the slippage resistance were also evaluated.

The tests for the slippage resistance was performed by Amusla Type abrasion tester for a textile cloth in such a manner as that the test sample was repeatedly stretched by 3 kg of a load. After the sample was stretched for 2500 times, the abrasion state was observed and evaluated. One sample was stitched with another sample in such a manner that the seam was 10 cm wide and it was parallel to the horizontal side. The four slits were made, and each slit was 88 mm wide and was parallel to the vertical side. Furthermore, each slit was placed at 25 mm from the vertical side, so the space between two slits was 50 mm wide. The tests for the strength of the seam was performed by pinching the sample at the space between two slits.

In Table 5, O shows that the abrasion was not more than 2.2 mm, X shows that the abrasion was more than 2.2 mm. The texture was determined by the hand touch. The result is shown in Table 5.

Comparative Example 9

A comparative example 9 employed the same compositions and the same manner as described in the twenty-first embodiment except that an acrylic type emulsion containing 50% by weight of a non-volatile matter in which a polymer composition was 90% by weight of butyl acrylate, 8% by weight of methyl acrylate and 2% by weight of acrylic acid, and in which the glass-transition temperature was −55° C. was used; thereby obtaining the interior material.

The performance of the deodorization, the flame retardation, the texture and the slippage resistance were evaluated by the same method as that in the twenty-first embodiment. The result is shown in Table 5.

Comparative Example 10

A comparative example 10 employed the same compositions and the same manner as described in the twenty-first embodiment except that an acrylic type emulsion in which a polymer composition was 50% by weight of butylacrylate, 48% by weight of methyl acrylate and 2% by weight of acrylic acid, and in which the glass-transition temperature was +5° C. was used; thereby obtaining the same interior material as that in the twenty-first embodiment.

The performance of the deodorization, the flame retardation, the texture and the slippage resistance were evaluated by the same method as that in the twenty-first embodiment. The result is shown in Table 5.

TABLE 5

|  | Embodiment | Comparative Examples | |
| --- | --- | --- | --- |
|  | 21 | 9 | 10 |
| Deodorization | O | O | O |
| Flame Retardation | O | O | O |
| Texture | O | O | X |
| Slippage Resistance | O | X | O |

Concerning an interior material described in the twenty-first embodiment, the performance of the deodorization, the flame retardation, the texture and the slippage resistance were good.

As for an interior material in which the synthetic resin composition (the glass transition temperature being −55° C.) was used for the backing described in the comparative example 9, the performance of the deodorization, the flame retardation and the texture were good, but the slippage resistance was poor. So, it is unsuitable for an interior material for a seat which especially needs for the slippage resistance.

As for an interior material in which the synthetic resin composition (the glass-transition temperature being +5° C.) was used for the backing described in the comparative example 10, the performance of the deodorization, the flame retardation and the slippage resistance were good, but the texture was poor. So, it is unsuitable for an interior material for a seat which especially needs for the excellent feeling.

The synthetic resin composition described in the twenty-first embodiment is suitable for an interior material for a seat which especially requires the excellent texture and the slippage resistance.

Twenty-second Preferred Embodiment 140 parts by weight of the deionization water, 1 parts by weight of sodium alkyl benzene sulfonic acid, 0.05 parts by weight of EDTA, 50 parts by weight of butadiene, 3 parts by weight or acrylic acid, 47 parts by weight of styrene, 0.1 parts by weight of t-dodecylmercaptan and 0.3 parts by weight of potassium persulfate were added into the proof-pressure reacting vessel with the agitator which the glasslining was performed. The nitrogen substitution was performed, and the polymerization was performed at 65° C. for 10 hours. After that, an aqueous ammonia was added to the contents to adjust pH 8 to 9. Then, the contents were added to a stripper, and the decompression was performed while inserting water vapor of 100° C. The elimination and the concentration of a residual monomer was performed at the same time. The concentration of a solid matter of the obtained resin latex was 50%.

90 parts by weight of sepiolite whose grain size was not more than 100 mesh and 90 parts by weight of activated carbon whose grain size was not more than 250 mesh are mixed by the dry blending. 0.9 parts by weight of sodium alkyl naphthalene sulfonic acid having the weight-average molecular weight of 342, 5 parts by weight of a carboxymethyl cellulose having the weight-average molecular weight of 13000 and 5 parts by weight of 1, 6-hexamethylenebis (N, N'-dimethyl semicarbazide) {as shown in formula (1)} were dissolved into 370 parts by weight of water and were mixed by a biaxial blender.

200 parts by weight of the obtained resin latex was added to the above mixed solution and mixed. The obtained synthetic resin composition containing 38% by weight of a non-volatile matter was coated by a doctor blade to a rear face of a fabric comprising a polyester fiber in such a manner that 110 g/m² of a non-volatile matter was contained, and was dried in a hot air drier at 130° C. for 20 minutes to obtain an interior material for a vehicle.

Comparative Example 11

A comparative example 11 employed the same compositions and the same manner as described in the twenty-second embodiment except that 1, 6-hexamethylenebis (N, N'-dimethyl semicarbazide) as a stabilizer was omitted; thereby obtaining an interior material for a vehicle.

Twenty-third Preferred Embodiment

A twenty-third embodiment employed the same compositions and the same manner as described in the twenty-second embodiment except that methacrylic methyl was used instead of styrene, and that the components of a copolymerization was methacrylic methyl in all amount; thereby obtaining a resin latex as described in the twenty-second embodiment. The obtained resin latex contained 50% by weight of a solid material.

Then, the twenty-third embodiment employed the same compositions and the same manner as described in the twenty-second embodiment except that 5 parts by weight of 1, 1, 1', 1'-tetramethyl-4, 4'-(methylene-di-P-phenylene) disemicarbazide {as shown in formula (2)} was used instead of 1, 6-hexamethylenebis (N, N'-dimethyl semicarbazide) as a stabilizer; thereby obtaining the synthetic resin composition as described in the twenty-second embodiment.

After that, the synthetic resin composition was applied to a fabric and was dried; thereby obtaining the interior material for a vehicle.

Twenty-fourth Preferred Embodiment

A twenty-fourth embodiment employed the same compositions and the same manner as described in the twenty-third embodiment except that 2.5 parts by weight of 1, 1, 1', 1'-tetramethyl-4, 4'-(methylene-di-P-phenylene) disemicarbazide and 2.5 parts by weight of 1, 6-hexamethylenebis (N, N'-dimethyl semicarbazide) as a stabilizer were mixed; thereby obtaining the synthetic resin composition as described in the twenty-second embodiment and manufacturing an interior material for a vehicle. The obtained synthetic resin composition showed no change after it was let alone at the room temperature (25° C.) for more than one month.

Comparative Example 12

A comparative example 12 employed the same compositions and the same manner as described in the twenty-second embodiment except that a stabilizer was not added; thereby obtaining the synthetic resin composition as described in the twenty-second embodiment and manufacturing the interior material.

Comparative Example 13

A comparative example 13 employed the same compositions and the same manner as described in the twenty-second embodiment except that 2-(5-methyl-2-hydroxyphenyl) benzotriazole was used instead of 1, 6-hexamethylenebis (N, N'-dimethyl semicarbazide) as a stabilizer; thereby obtaining the interior material for a vehicle.

TABLE 6

|  | Items | Embodiments | | | Comparative Examples | | |
| --- | --- | --- | --- | --- | --- | --- | --- |
|  |  | 22 | 23 | 24 | 11 | 12 | 13 |
| Flexibility (Texture) | Initial Stage Light Fastness (Fed Meter) | Soft | Soft | Soft | Soft | Soft | Soft |
|  | 83° C. × 150 hours later | Soft | Soft | Soft | A little hard | A little hard | Soft |
|  | 83° C. × 200 hours later | Soft | Soft | Soft | Hard | A little hard | A little hard |
|  | 83° C. × 400 hours later | a little hard | Soft | Soft | Hard | Hard | Hard |
|  | Heat Resistance |  |  |  |  |  |  |
|  | 120° C. × 50 hours later | Soft | Soft | Soft | Hard | A little hard | A little hard |
|  | 120° C. × 200 hours later | Soft | Soft | Soft | Hard | A little hard | Hard |
| Bonding Strength (Slippage Resistance) | Initial Stage Light Fastness (Fed Meter) | ○ | ○ | ○ | ○ | ○ | ○ |
|  | 83° C. × 200 hours later | ○ | ○ | ○ | X | Δ | Δ |
|  | 83° C. × 400 hours later | Δ | ○ | ○ | X | X | X |
|  | Heat Resistance |  |  |  |  |  |  |
|  | 120° C. × 200 hours later | ○ | ○ | ○ | X | Δ | X |
| Antistatic Performance |  | No Electric Shock | No Electric Shock | No Electric Shock | No Electric Shock | No Electric Shock | Electric Shock |
| Deodorizazation |  | Good | Good | Good | Slightly Good | Good | Slightly Bad |

As shown in Table 6, the evaluation for an interior material for a vehicle was performed as follows.

Flexibility(Texture): The texture was compared by the hand touch between three stages; at an initial stage, during tests for the light fastness (after an irradiation of a fade meter) and after testing.

Bonding strength(Slippage resistance): More than two pairs of samples in which the width was 10 cm and the length was 10 cm were prepared. One sample was put on another sample in such a manner that the seam was placed at 10 mm from the horizontal side. Two slits were made, and each slit was 88 mm wide and was parallel to the vertical side. Furthermore, each slit was placed at 25 mm from the vertical side, so the space between two slits was 50 mm wide. By using Amusla type abrasion tester for a textile cloth, the sample was repeatedly stretched by 3 kg of a load. After the sample was stretched for 2500 times, the abrasion state of the seam was observed. In Table 6, O shows that the abrasion was not more than 1.7 mm, Δ shows that the abrasion was in the range of 1.7 to 2.2 mm, X shows that the abrasion was more than 2.2 mm.

The antistataic performance: The test sample was put on the insulated seat at a low temperature and a low humidity. The tester wore clothes made of 100% of wool and sat on the seat. After the friction movement was performed, the tester stood up and the feeling of an electric shock was measured when the tester touched the part of a metal in the room.

The performance of the deodorization: To evaluate the performance of the deodorization of the obtained interior material, the amount of ammonia and toluene adsorped was measured by the adsorption test.

As for an interior material described in the embodiments 22 and 23, the texture is almost the same as that at an initial stage after the test for the light fastness and the heat resistance. On the other hand, concerning an interior material described in comparative examples 11 and 12 in which a stabilizer is not contained, the texture becomes little hard after the test for the light fastness has been performed for 150 hours, and the texture becomes hard after the test for the light fastness has been performed for 400 hours. After the test for the heat resistance has been performed, the texture becomes hard and a layer of a resin deteriorates. By adding a light-stabilizer described in comparative example 13, the texture shows no change after the test for the light fastness has been performed for 150 hours, but the texture becomes hard after the test for the light fastness has been performed for more than 200 hours. After the test for the heat resistance has been performed, the texture becomes hard and the heat resistance is not enough. So, the interior materials described in the comparative examples 11 to 13 don't show the same light fastness and the heat resistance as that in the present invention.

In the embodiments, the bonding strength of the interior material and a layer of a resin shows no change after the test for the light fastness and the heat resistance has been performed, so it is described as O. On the other hand, in the comparative examples, the abrasion state of the seam is remarkable after the test for the light fastness and the heat resistance has been performed, so it is described as Δ, X. This shows that a layer of a resin deteriorates.

Therefore, a stabilizer comprising a semicarbazide type compound contributes to the improvement of the light fastness and the heat resistance of a layer of a resin and an interior material. The light fastness and the heat resistance of an interior material can be maintained without deteriorating the effect of the additives such as a deodorant and an antistatic which are added to the synthetic resin composition.

Twenty-fifth Preferred Embodiment

The synthetic resin composition described in the first embodiment was bubbled for 2.5 times by an oaks mixer. The synthetic resin composition was coated by a doctor blade to a rear face of a fabric comprising a polyester fiber in such a manner that 80 g/m$^2$ of a non-volatile matter was contained, and was dried in a hot air drier at 130° C. for 20 minutes to obtain a porous interior material for a vehicle. The performance of the deodorization and the slippage resistance for the obtained synthetic resin composition were evaluated by the same method as that in the twenty-first embodiment. The result is shown in Table 7.

Comparative Example 14

A comparative example 14 employed the same compositions and the same manner as described in the twenty-fifth embodiment except that the synthetic resin composition was not bubbled; thereby obtaining the interior material for a vehicle.

Twenty-sixth Preferred Embodiment

The synthetic resin composition described in the fourth embodiment was bubbled for 2.5 times by an oaks mixer. The synthetic resin composition was coated by a doctor blade to a rear face of a fabric comprising polyester fiber in such a manner that 80 g/m$^2$ of a non-volatile matter was contained, and was dried to obtain an interior material for a vehicle. The performance of the deodorization and the slippage resistance for the obtained synthetic resin composition were evaluated by the same method as that in the twenty-first embodiment. The result is shown in Table 7.

Comparative Example 15

A comparative example 15 employed the same compositions and the same manner as described in the twenty-sixth embodiment except that the synthetic resin composition was not bubbled; thereby obtaining the interior material for a vehicle.

Twenty-seventh Preferred Embodiment

The synthetic resin composition described in the sixth embodiment was bubbled for 2.5 times by an oaks mixer. The synthetic resin composition was coated by a doctor blade to a rear face of a fabric comprising polyester fiber in such a manner that 80 g/m$^2$ of a non-volatile matter was contained, and was dried to obtain an interior material for a vehicle. The performance of the deodorization and the slippage resistance for the obtained synthetic resin composition were evaluated by the same method as that in the twenty-first embodiment. The result is shown in Table 7.

Comparative Example 16

A comparative example 16 employed the same compositions and the same manner as described in the twenty-seventh embodiment except that the synthetic resin composition was not bubbled; thereby obtaining the interior material for a vehicle.

TABLE 7

|  | Embodiments | | | Comparative Examples | | |
|---|---|---|---|---|---|---|
|  | 25 | 26 | 27 | 14 | 15 | 16 |
| Deodorization | ◉ | ◉ | ◉ | ○ | ○ | ○ |
| Slippage Resistance | ○ | ○ | ○ | ○ | ○ | ○ |

As seen from Table 7, the slippage resistance is good as for the interior materials not only in the embodiments 25 to 27 but also in the comparative examples 14 to 16. The performance of the deodorization is good as for the interior materials in the comparative examples 14 to 16, while it is better as for the interior materials in the embodiments 25 to 27.

Therefore, the performance of the deodorization improves by bubbling before the synthetic resin composition is applied to a cloth.

Twenty-eighth Preferred Embodiment

A twenty-eighth preferred embodiment according to this invention employed an aqueous polyurethane type emulsion containing 40% by weight of a non-volatile matter which comprised 100 parts by weight of an aqueous polyurethane resin containing 50% by weight of a solid matter whose main components were adipic acid, neopentyl glycol, 1,6-hexane glycol and isohorodi isocyanate (starting temperature of melting being 175° C., 100% modulus 26 kg/cm$^2$), 17 parts by weight of an antimony dispersing solution, 33 parts by weight of a decabromo biphenyl ether dispersing solution, 4 parts by weight of an acrylic emulsion type thickening agent, 0.4 parts by weight of 28% of an aqueous ammonia and water; thereby obtaining the synthetic resin composition as follows.

90 parts by weight of sepiolite whose grain size was not more than 100 mesh and 90 parts by weight of activated carbon whose grain size was not more than 250 mesh were mixed by the dry blending. 0.9 parts by weight of sodium alkyl naphthalene sulfonic acid as a surfactant having the weight-average molecular weight of 342 and 5 parts by weight of a carboxymethyl cellulose having the weight-average molecular weight of 130000 were dissolved into 366 parts by weight of water and were mixed by a biaxial blender.

After that, 200 parts by weight of the above-mentioned aqueous polyurethane type emulsion containing 40% by weight of a non-volatile matter and 100 parts by weight of an aqueous dispersion of a flame retardant containing antimony trioxide and decabromodiphenyl oxide, (the ratio of a non-volatile matter being 1:2, an aqueous dispersion containing 60% by weight of a non-volatile matter) were added and mixed, furthermore water was added to obtain the synthetic resin composition which contained 38% by weight of a non-volatile matter.

The obtained synthetic resin composition was bubbled for 2.5 times by an oaks mixer, and was coated by a doctor blade to a rear face of a fabric comprising a polyester fiber in such a manner that 60 g/m$^2$ of a non-volatile matter was contained, and was dried in a hot air drier at 130° C. for 20 minutes to obtain a porous interior material for a vehicle. The performance of deodorization of the obtained interior materials was evaluated by the amount of ammonium adsorped and toluene adsorped as described in the first embodiment.

The burning speed was measured based on FMVSS-302, and the flame retardation was evaluated by the measured burning speed.

Comparative Example 17

A comparative example 17 employed the same compositions and the same method as described in the twenty-eighth embodiment except that the synthetic resin composition wasn't bubbled; thereby obtaining the interior material. The performance of the deodorization and the flame retardation was measured in the same manner as that in the twenty-eighth embodiment.

Twenty-ninth Preferred Embodiment

A twenty-ninth preferred embodiment employed the same compositions and the same manner as described in the twenty-eighth embodiment except that an aqueous dispersion comprised antimony trioxide and decabromodiphenyl oxide (the ratio of a non-volatile matter being 1:2, an aqueous dispersion containing 60% by weight of a non-volatile matter); thereby obtaining the synthetic resin composition.

The synthetic resin composition was applied to a fabric and was dried to obtain a porous interior material in the same manner as that in the twenty-eighth embodiment.

The performance of the deodorization and the flame retardation was evaluated by the same method as that in the twenty-eighth embodiment.

Comparative Example 18

A comparative example 18 employed the same compositions and the same method as described in the twenty-ninth embodiment except that the synthetic resin composition wasn't bubbled; thereby obtaining the interior material. The performance of the deodorization and the flame retardation was measured in the same manner as that in the twenty-ninth embodiment. The result is shown in Table 8.

Thirtieth Preferred Embodiment

A thirtieth preferred embodiment employed the same compositions and the same manner as described in the twenty-eighth embodiment except that an aqueous dispersion comprised antimony trioxide and tetrabromobisphenol A (the ratio of a non-volatile matter being 1:3, an aqueous dispersion containing 60% by weight of a non-volatile matter); thereby obtaining the synthetic resin composition.

The synthetic resin composition was applied to a fabric and was dried to obtain a porous interior material in the same manner as that in the twenty-eighth embodiment.

The performance of the deodorization and the flame retardation were evaluated by the same method as that in the twenty-eighth embodiment.

Comparative Example 19

A comparative example 19 employed the same compositions and the same method as described in the thirtieth embodiment except that the synthetic resin composition wasn't bubbled; thereby obtaining the interior material, The performance of the deodorization and the flame retardation were measured in the same manner as that in the thirtieth embodiment, The result is shown in Table 8.

TABLE 8

|  | Embodiments 28 to 30 | Comparative Examples 17 to 19 |
|---|---|---|
| Deodorization | ⊙ | ○ |
| Flame Retardation | ⊙ | ○ |

As shown in Table 8, the performance of the deodorization is good as for the interior materials in the comparative examples 17 to 19 in which the synthetic resin composition is used for the backing to a cloth without being bubbled. On the other hand, the performance of the deodorization further improves as for the interior materials in the embodiments 28 to 30 in which the synthetic resin composition is bubbled and is used for the backing. Furthermore, the interior material which is bubbled is superior to the interior materials which are not bubbled in the flame retardation which improves by adding the flame retardant.

In the synthetic resin composition of the present invention, a non-volatile matter comprising a resin and a filler is dispersed by two kinds of surfactants. So, the dispersibility of a non-volatile matter improves and the required amount of water decreases, then increasing a non-volatile matter with the low viscosity. The storage stability at the room temperature also improves.

By preparing two kinds of surfactants, an inorganic flame retardant, an organic flame retardant and a specific stabilizer are stably dispersed into an aqueous medium with a resin and a filler.

As the result, concerning an interior material in which the synthetic resin composition is applied to a cloth, the performance of the deodorization and the flame retardation is good at the high level. Furthermore, by adding a specific stabilizer, the interior material is superior to the conventional interior material in the heat resistance and the flame retardant, and the texture at the initial stage and the bonding strength can be maintained for a long time. Moreover, by adding an adsorbent such as a deodorizing additive or an antistatic substance, the component of a resin doesn't deteriorate, so the performance of an interior material doesn't deteriorate and can be maintained for a long time. Therefore, an interior material in which the synthetic resin composition is applied to a cloth is enable to use at the part on which the light and the heat influences.

When an acrylic type resin and a specific amount of styrene is copolymerized and the glass-transition temperature is in the range of −20° to +20° C., the performance of the deodorization and the flame retardation improves. Furthermore, the formation improves and the usage is expanded to a ceiling material which needs for the formation. When an acrylic type resin in which the average particle diameter is in the range of 0.2 to 0.6 μm, and in which the glass-transition temperature is in the range of −50° to 0° C. is used, an odor of a resin as an interior material is less, and the performance of the deodorization and the flame retardation improves. Moreover, the texture and the strength of an interior material in which the backing is performed improves.

According to an interior material of the present invention, the amount of a non-volatile matter increases and the decreasing of the required coating amount can be achieved. Furthermore, the performance of the deodorization extremely improves by bubbling, and the strength of the coated cloths improves.

The interior material can adsorb and remove an odor of tobacco and an odor in new caps which comprises pyridine derivative, styrene and ester, so it is suitable for deodorizing an odor in a vehicle.

The antistatic function and the function for preventing the dirt can be added because the flame retardation improves without deteriorating the texture, and because not only activated carbon having the electric conductivity but also the electric conductivity agent is prepared. So, the interior material is suitable for an interior material of a vehicle, especially for an interior material for a seat. Furthermore, it is suitable not only for a ship or an air plane, but also for an interior material for a seat in a house, a carpet, a wall paper and a ceiling material.

We claim:

1. A synthetic resin composition comprising an aqueous medium, two surfactants, and a resin and an odor-reducing amount of filler dispersed in said aqueous medium by said surfactants wherein said resin is selected from the group consisting of an acrylic resin, an ethylene-vinyl acetate resin, a polyurethane resin and a polybutadiene resin, said filler comprises a hydrated magnesium silicate based clay mineral and activated carbon, wherein said filler is present in an amount of 50 to 200 parts by weight based on 100 parts by weight of said resin, and said surfactants comprising (i) from 0.1 to 20 parts by weight of a first high molecular weight compound having a weight-average molecular weight of at least 10000 and (ii) from 0.3 to 10 parts by weight of a second high molecular weight compound having a weight-average molecular weight of not less than 150 and less than 10000, with respect to 100 parts by weight of said resin so as to maintain an action of deodorization of said filler and so the content of said resin and said filler can be increased, wherein said composition has a solids content of at least 25%.

2. A synthetic resin composition according to claim 1, wherein the content of said activated carbon is 5 to 90 parts by weight with respect to 100 parts by weight of the total amount of said hydrated magnesium silicate based clay mineral and activated carbon.

3. A synthetic resin composition according to claim 1, wherein said resin is an acrylic resin.

4. A synthetic resin composition according to claim 1, wherein the average particle diameter of said resin is in the range of 0.2 to 0.6 μm.

5. A synthetic resin composition according to claim 4, wherein said resin is an acrylic resin whose glass-transition temperature is −55° C. to 0° C.

6. A synthetic resin composition according to claim 1, wherein said resin is a rubber latex and said synthetic resin composition further comprises a semicarbazide compound as a stabilizer.

7. A synthetic resin composition according to claim 6, wherein said semicarbazide compound is a compound represented by the following formula:

wherein R is $(CH_2)_n$ or $C_6H_4CH_2C_6H_4$; $R_1$, $R_2$, $R_3$, $R_4$ is a hydrogen atom or an alkyl group whose carbon number is 1 to 12; and n is an integral number 1 to 12.

8. A synthetic resin composition according to claim 1, further comprising antimony oxide, and a bromine diaryl oxide and/or bromine arene dispersed in said aqueous medium by said surfactant.

9. A synthetic resin composition according to claim 1, wherein said resin is an acrylic resin whose glass-transition temperature is in the range of −20° C. to 20° C., and which contains 5 to 45% by weight of stylene.

10. A synthetic resin composition according to claim 5, further comprising antimony oxide, and bromine diaryl oxide and/or bromine arene dispersed in said aqueous medium by said surfactants.

11. A synthetic resin composition according to claim 9, further comprising antimony oxide, and bromine diaryl oxide and/or bromine arene dispersed in said aqueous medium by said surfactants.

12. A synthetic resin composition according to claim 1, wherein said first high molecular weight compound having a weight-average molecular weight of at least 10000 is selected from the group consisting of polyvinyl alcohol, sodium polyacrylic acid salt, a styrene-maleic acid copolymer, cellulose derivatives and polyoxy alkylene aryl ethers and said second high molecular weight compound having a weight-average molecular weight of not less than 150 and less than 10000 is selected from the group consisting of a tripolyphosphate, sodium polyacrylic acid salt, polyvinyl alcohol, an alkyl aryl sulfonate and a polyoxy alkylene aryl ether.

* * * * *